United States Patent [19]
Miller

[11] 3,999,814
[45] Dec. 28, 1976

[54] BEARING SPOOL FOR A DISC
[76] Inventor: Maurice E. Miller, Stratton, Nebr. 69043
[22] Filed: Nov. 11, 1975
[21] Appl. No.: 631,144

[52] U.S. Cl. .............................. 308/181; 172/518
[51] Int. Cl.² ........................................ F16C 13/00
[58] Field of Search ............ 308/181, 91; 172/518, 172/579, 599

[56] References Cited
UNITED STATES PATENTS

| 2,597,524 | 5/1952 | Birt | 308/181 |
| 2,657,103 | 10/1953 | Kincaide | 308/181 |
| 2,712,966 | 7/1955 | Brady et al. | 308/181 |

Primary Examiner—Joseph F. Peters
Assistant Examiner—Richard A. Bertsch
Attorney, Agent, or Firm—Zarley, McKee, Thomte & Voorhees

[57] ABSTRACT

A bearing spool for a disc harrow including a frame means having at least a pair of spaced-apart bearing brackets extending therefrom. A bearing is mounted in each of the bearing brackets and has the bearing spool rotatably mounted therein. A section shaft extends through the bearing spool and has a plurality of spaced-apart disc blades mounted thereon which are spaced by means of spacer spools. Each of the bearing spools comprise first and second spool members having means thereon for preventing relative rotation therebetween. Means is also provided on the spool members and the adjacent disc blades for preventing relative rotation therebetween.

7 Claims, 11 Drawing Figures

U.S. Patent  Dec. 28, 1976  Sheet 1 of 2  3,999,814
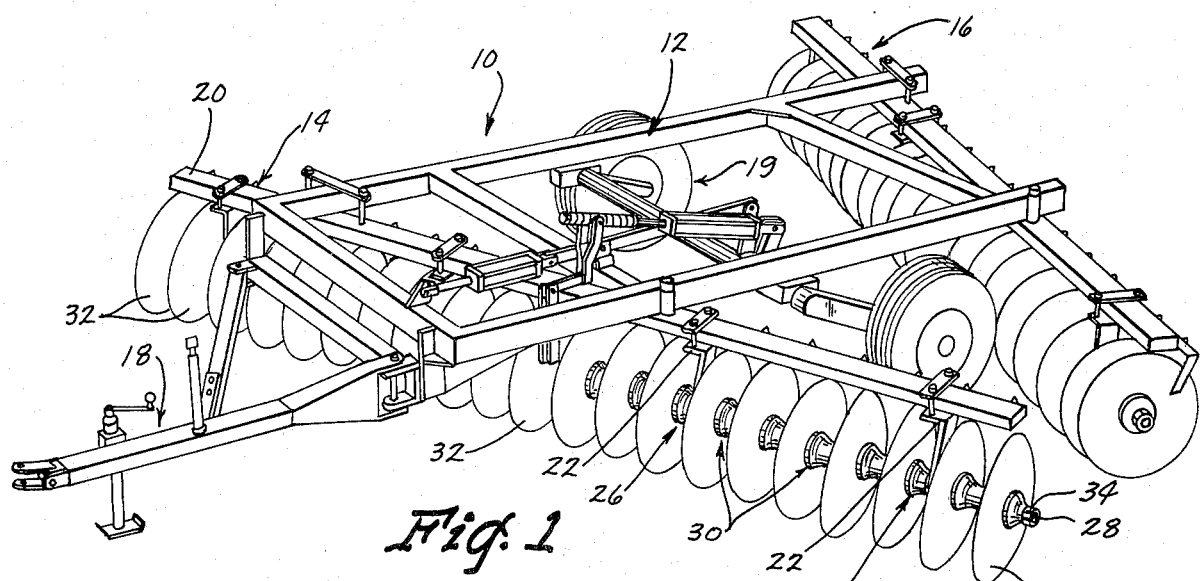
Fig. 1
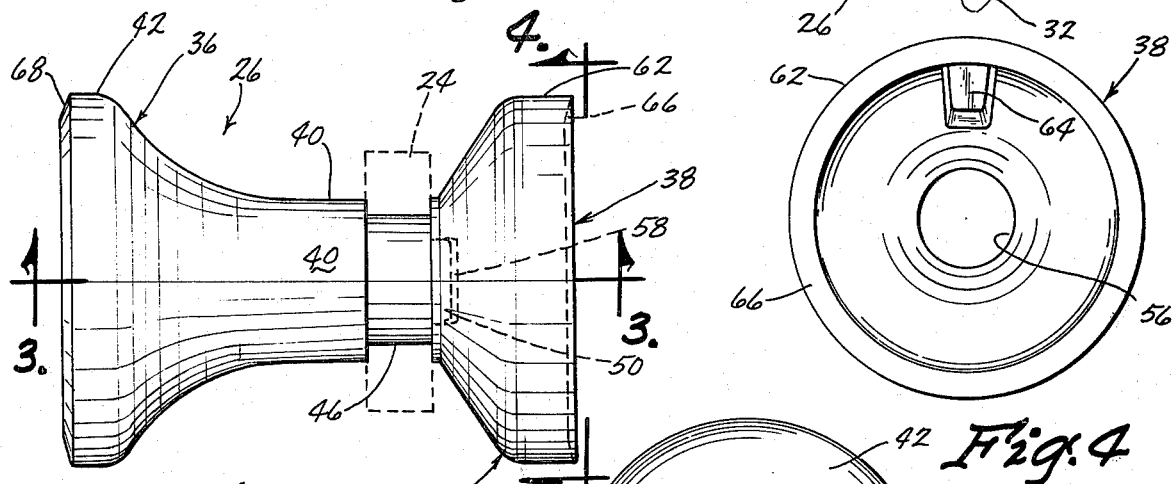
Fig. 2
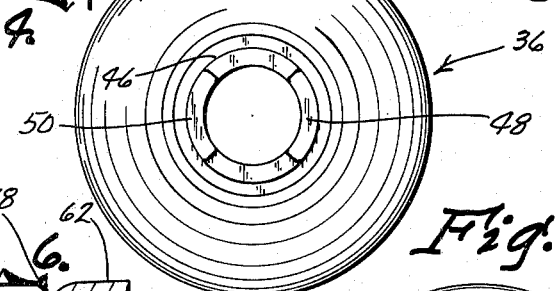
Fig. 4
Fig. 5
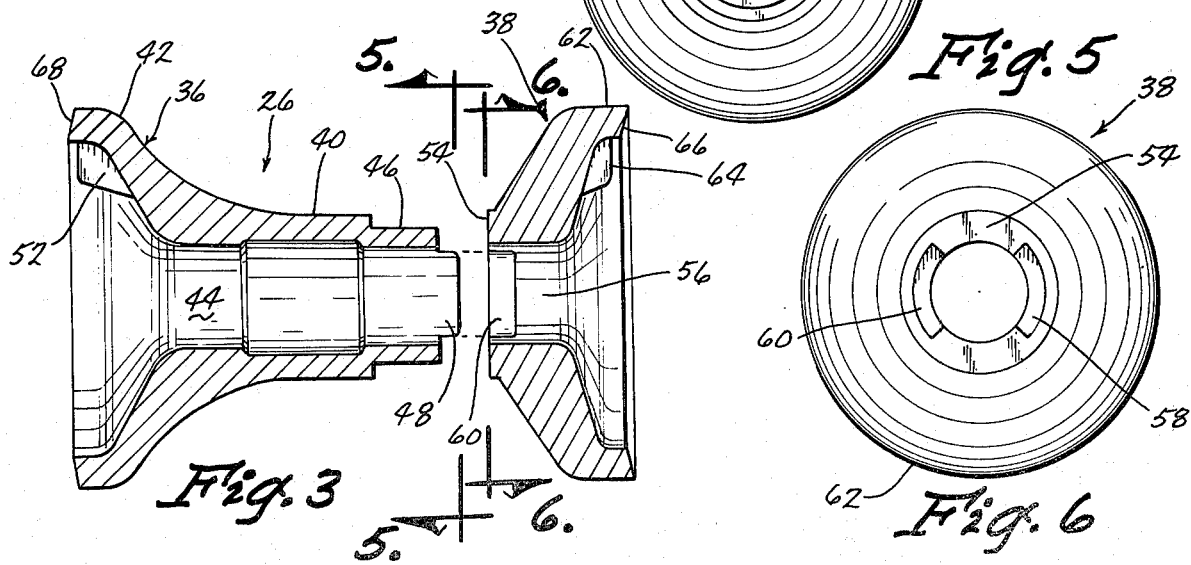
Fig. 3
Fig. 6

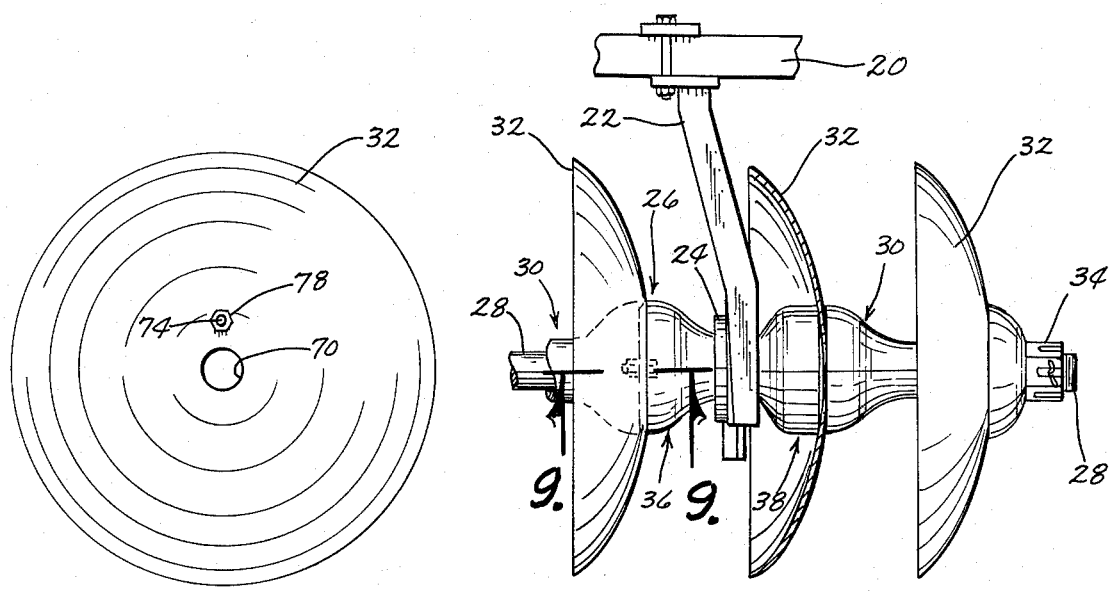
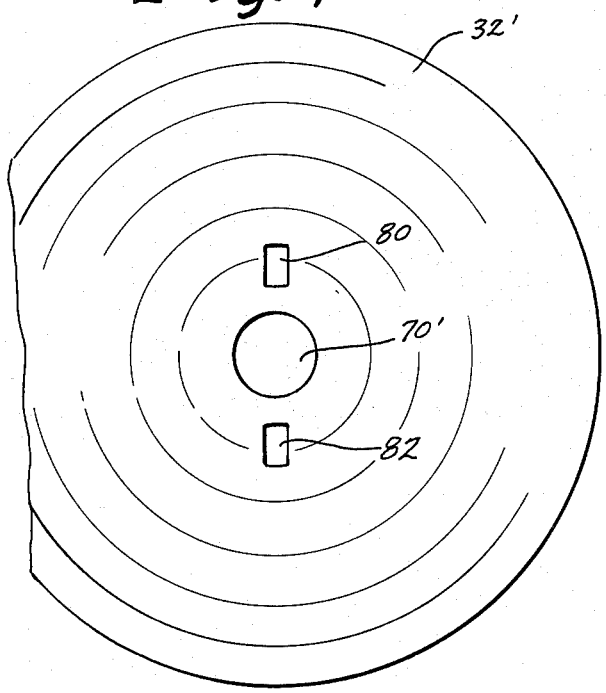
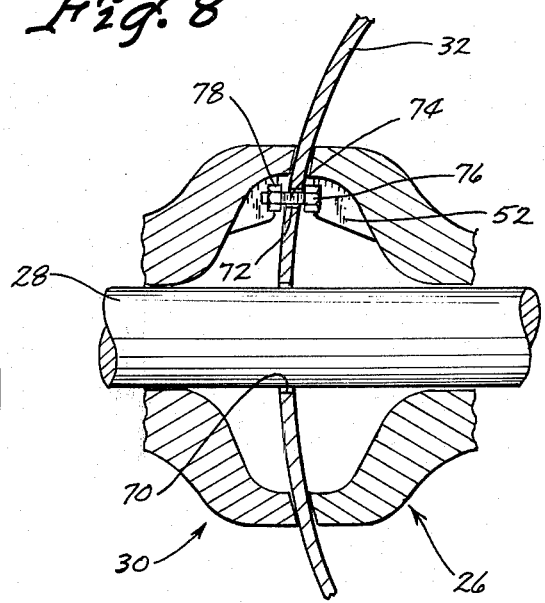
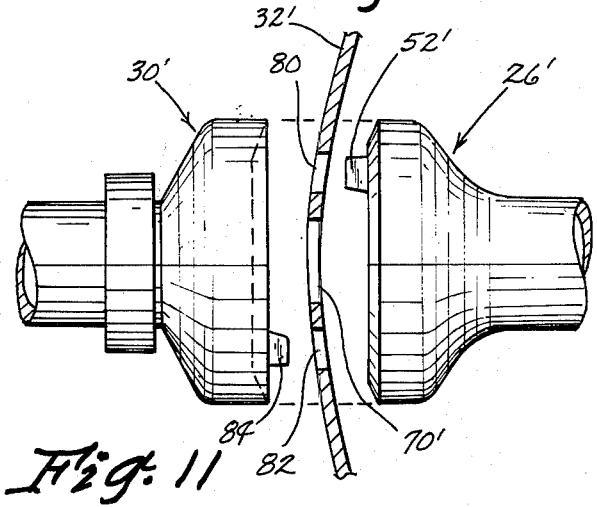

BEARING SPOOL FOR A DISC

BACKGROUND OF THE INVENTION

Disc harrows ordinarily comprise at least one disc section including a plurality of spaced-apart disc blades mounted on a section shaft which is rotatably supported by the disc harrow. Spacer spools are ordinarily positioned between adjacent disc blades. The section shaft is generally rotatably mounted in spaced-apart bearings which are mounted in bearing brackets secured to the disc section frame means.

In years past, the section shaft has a square configuration with each of the disc blades having a square opening formed in the center thereof which received the square shaft extending therethrough. Many of the previous bearing spools also included a square opening formed therein which received the shaft. In those disc harrows employing square shafts, it was not a problem to prevent relative rotation between the disc blades, bearing spools and shaft. Likewise, in those disc harrows employing square shafts, it was not a problem to prevent relative rotation between the two bearing spool members which comprised the bearing spool. However, the problems connected with the fabrication of square shafts have led many disc harrow manufacturers to utilize round shafts rather than square shafts. It has been found that it is much easier to produce round shafts than to produce square shafts.

The use of round shafts in disc sections creates a serious problem in that relative rotation is experienced between the disc blades and the bearing spools as the disc harrow is moved through the field. Attempts are made to prevent such relative movement by tightening the nut at the end of the shaft but is practically impossible to apply sufficient torque to the nut to prevent such rotation. Relative rotation between the bearing spools and the disc blades creates wear on the ends of the bearing spools which results in the need for constant tightening of the shaft nut. It is only a question of time before the bearing spools must be replaced due to the wear on the ends thereof.

Relative rotation between the bearing spool members which comprise the bearing spool creates wear on the abutting ends of the bearing spool members which also results in the need for constant tightening of the shaft nut.

Therefore, it is a principle object of invention to provide an improved bearing spool.

A still further object of the invention is to provide a bearing spool in combination with a disc blade wherein relative rotation is prevented between the bearing spool and the adjacent disc blades.

A still further object of the invention is to provide a disc section for a disc harrow which permits the use of a round section shaft without the accompanying problems normally associated with such a round section shaft.

A still further object of the invention is to provide a disc section which includes means for preventing relative rotation between the disc blades and the bearing spools as the disc harrow is moved through the field.

A still further object of the invention is to provide a bearing spool comprised of a pair of spool members and means for preventing relative rotation between the spool members.

A still further object of the invention is to provide a bearing spool which is economical to manufacture, durable in use and refined in appearance.

BRIEF DESCRIPTION OF THE DRAWINGS

FIG. 1 is a perspective view of a disc harrow;
FIG. 2 is a side elevational view of the bearing spool of this invention;
FIG. 3 is an exploded sectional view taken on lines 3—3 of FIG) 2;
FIG. 4 is an end view as seen on lines 4—4 of FIG. 2;
FIG. 5 is an end view as seen on lines 5—5 of FIG. 3;
FIG. 6 is an end view as seen on lines 6—6 of FIG. 3;
FIG. 7 is a plan view of a disc blade;
FIG. 8 is a partial view of the disc harrow with portions cut away;
FIG. 9 is an enlarged sectional view as seen on lines 9—9 of FIG. 8;
FIG. 10 is a plan view of a modified form of a disc blade; and
FIG. 11 is an exploded side view illustrating a modified form of the bearing spool.

DESCRIPTION OF THE PREFERRED EMBODIMENT

The numeral 10 refers generally to a disc harrow comprising a frame means 12 including front disc section 14 and rear disc section 16. A hitch assembly 18 extends forwardly from frame means 12 for connection to a prime mover such as a tractor or the like. The numeral 19 refers to a conventional wheel assembly.

Front disc section 14 comprises an elongated frame member 20 which is secured to frame means 12 as illustrated in FIG. 1. A plurality of bearing brackets 22 are secured at their upper ends to frame member 20 and extend downwardly therefrom in a spaced-apart relationship. Each of the bearing brackets 22 have a bearing 24 secured thereto at the lower ends thereof in conventional fashion as illustrated in the drawings.

A bearing spool 26 is mounted in each of the bearings 24 as will be described in more detail hereinafter. The numeral 28 refers to a section shaft which extends through the bearing spools 26, spacer spools 30 and disc blades 32. Nuts 34 are provided on the opposite ends of the section shaft 28 for maintaining the disc blades 32, spacer spools 30 and bearing spools 26 in the assembled condition seen in the drawings.

Each of the bearing spools 26 generally comprises bearing spool members 36 and 38. Spool member 36 includes a hub portion 40 and an end portion 42. Central opening 44 extends through the spool member 36 for receiving the shaft 28. Hub portion 40 is provided with a reduced diameter portion 46 which is adapted to receive the bearing 24 thereon. Reduced diameter portion 46 is also provided with a pair of spaced-apart projections or shoulders 48 and 50 extending from the inner end thereof. End portion 42 is provided with a solid lug 52 which is slightly tapered as illustrated in the drawings.

Spool member 38 is provided with a flat surface 54 at its inner end and a central opening 56 extending therethrough. A pair of insets or keyways 58 and 60 are formed in the inner end of spool member 38 and are complimentary in shape to the shoulders 48 and 50 and are adapted to receive the same. The outer end portion 62 of spool member 38 is provided with a solid lug 64 projecting therefrom and being tapered as illustrated in the drawings. End portion 62 of spool member 38 is provided with an annular rim or peripheral portion 66 which is concave so as to be complimentary in shape to the curvature of the disc blade 32 positioned thereagainst. Likewise, end portion 42 of spool member 36 is provided with an annular rim or peripheral portion 68 which is convex so as to be complimentary in shape to the curvature of the disc blade adjacent thereto.

Each of the disc blades 32 is provided with a central opening 70 formed therein and a bolt opening 72 formed therein outwardly of the central opening 70. A bolt 74 is positioned in each of the bolt opening 72 so that its head 76 is positioned adjacent one side of the disc blade and so that the nut 78 is positioned adjacent the other of the disc blade.

Thus, the shaft 28 extends through all of the spacer spools and bearing spools with the nuts 34 at the opposite ends thereof being tightened to maintain the same on the shaft. In the assembled condition, the shoulders 48 and 50 on spool member 36 are received by the insets 58 and 60 respectively which prevents relative rotational movement between spool members 36 and 38. The use of the lugs 52, 64 and the bolts 74 in the disc blades 32 prevents relative rotation between the bearing spool and the disc blades 32 on opposite ends thereof. In the assembled condition, the disc blade 32 to the left of one bearing spool 26 has a bolt head 76 positioned adjacent the side of the lug 52 while the disc blade 32 to the right of one bearing spool 26 would have the nut 78 of a bolt 74, in the adjacent blade 32, positioned thereagainst. FIG. 9 illustrates that the spacer spools 30 also have projecting lugs at the ends thereof which cooperate with the disc blade and adjacent bearing spool to prevent rotation between the bearing spool, disc blade and spacer spool adjacent thereto. The design of the spacer spool is the subject of a patent application entitled "A Spacer Spool" which is being filed concurrently herewith. Thus, when the disc section is assembled as illustrated in the drawings, the bearing spool and the blades will only rotate relative to each other until the heads and the nuts of the bolts 74 move into engagement with the lugs 52 and 64 which prevents further relative rotation thereby greatly increasing the life of the assembly.

Thus it can be seen that the device of this invention provides a means for preventing relative rotation between the spool members of the individual bearing spools and between the disc blades and the bearing spool. Thus it can be seen that the device of this invention accomplishes at least all of its stated objectives.

A modified form of the bearing spool is illustrated in FIG. 9 and is referred to generally by the reference numeral 26'. The bearing spool 26' is identical to bearing spool 26 except that the lugs 52' and 64' (not shown) are offset 180° to each other and extend beyond the outer ends of the spool members. Blade 32' has a central opening 70' and openings 80 and 82 formed therein outwardly of opening 70'. Opening 80 is adapted to receive the lug 52' therein while the opening 82 would receive the lug 84 extending from the spacer spool 30'. The lug 64' at the other end of the bearing spool 26 would be received by the opening 82 in the blade 32' adjacent thereto. Thus, as in the embodiment of FIGS. 1–9, a means has been provided for preventing relative rotation between the bearing spool and the disc blades adjacent thereto.

I claim:

1. A disc section for a disc harrow including a frame means having at least one bearing support, a bearing mounted in said bearing support, and a section shaft extending through said bearing, said section shaft having a circular cross-section, a bearing spool comprising first and second bearing spool members, said bearing being rotatably mounted on at least one of said bearing spool members, a plurality of spaced-apart disc blades mounted on said shaft, spacer tools positioned between adjacent disc blades except where said bearing spool is positioned, means connecting said first and second spool members to prevent relative rotation therebetween, said first and second spool members each having inner and outer ends, said first spool member having at least one shoulder means extending from the inner end thereof towards said second spool member, said second spool member having at least one opening formed in its inner end adapted to receive said shoulder means to prevent relative rotation between said spool members.

2. The disc section of claim 1 wherein said first spool member has at least a pair of spaced-apart shoulder means extending from the inner end thereof towards said second spool member, said second spool member having at least a pair of openings formed in its inner end adapted to receive said shoulders.

3. The disc section of claim 1 wherein said bearing spool has opposite ends and wherein a disc blade is positioned adjacent each of said opposite ends, and means connecting said spool members to said adjacent disc blades to prevent relative rotation therebetween as the disc harrow is moved through the field.

4. The disc section of claim 1 wherein said first spool member has a reduced diameter portion thereon which receives said bearing thereon.

5. The disc section of claim 1 wherein means is provided for preventing relative rotation between each of said spool members and the disc blades positioned adjacent thereto.

6. The disc section of claim 5 wherein said means comprises lugs extending outwardly from the outer ends of said spool members, the disc blades adjacent said spool members having a bolt opening formed therein outwardly of the center thereof, a bolt mounted in said bolt opening, said lugs on said spool members operatively engaging said bolts to prevent relative rotation between said disc blades and said spool members.

7. The disc section of claim 5 wherein said means comprises lugs extending outwardly from the outer ends of said spool members, the disc blades adjacent said spool members having openings formed therein for receiving said lugs.

* * * * *